US005179391A

United States Patent [19]

Miyazaki

[11] Patent Number: 5,179,391

[45] Date of Patent: Jan. 12, 1993

[54] THERMAL PRINTER AND THERMAL PRINTING METHOD

[75] Inventor: Takao Miyazaki, Tokyo, Japan

[73] Assignee: Fuji Photo Film Co., Ltd., Kanagawa, Japan

[21] Appl. No.: 489,295

[22] Filed: Mar. 5, 1990

[30] Foreign Application Priority Data

Mar. 3, 1989 [JP] Japan .................................. 1-51520
Mar. 3, 1989 [JP] Japan .................................. 1-51521

[51] Int. Cl.[5] .............................................. G01D 15/10
[52] U.S. Cl. ................................ 346/76 PH; 400/120
[58] Field of Search ........................... 346/76 PH, 1.1; 400/120

[56] References Cited

U.S. PATENT DOCUMENTS 4,666,320 5/1987 Kobayashi et al. ............ 346/76 PH
4,710,783 12/1987 Caine et al. .................... 346/76 PH
4,716,145 12/1987 Vanier et al. ....................... 503/227
4,912,486 3/1990 Yumino .......................... 346/76 PH

FOREIGN PATENT DOCUMENTS 0164853 7/1986 Japan .................................. 400/120
62-132680 6/1987 Japan .
0172666 7/1988 Japan ............................. 346/76 PH

*Primary Examiner*—Benjamin R. Fuller
*Assistant Examiner*—Huan Tran
*Attorney, Agent, or Firm*—Sughrue Mion Zinn Macpeak & Seas

[57] ABSTRACT

A thermal printer having a flattening unit which extends in the direction of intersecting the direction of feeding a recording paper. The flattening unit is heated to a temperature lower than the dye transfer temperature, and heats and presses the surface of the recording paper after printing to flatten the surface. Since there are fewer hard copies with characters being printed with black dye, the black dye transfer process period is used for the flattening process by a color image recording unit without providing a separate flattening unit.

12 Claims, 9 Drawing Sheets

THERMAL PRINTER AND THERMAL PRINTING METHOD

BACKGROUND OF THE INVENTION

The present invention relates to a thermal printer and to a thermal printing method, including flattening the surface of a recording paper on which an image has been printed.

One example of a known thermal printing method is a sublimation type thermal printing method, wherein an ink film is interposed between a thermal head and a recording paper, the ink film is heated from the back surface thereof, and heat activated dye is transferred to an image receiving layer of the recording paper and fixed therein. This sublimation type thermal printing method is suitable for printing a half-tone image such as a photographic picture because the method can record dots whose density is proportional to the thermal energy. The ink film has a thin film on which cyan, magenta, and yellow sections are formed alternately. There is also a known ink film having black sections in addition to the three color sections.

It is known that if an image is printed with a sublimation type thermal printer, irregular undulation is formed on the surface of a recording paper by the thermal head in accordance with image density and with heat and pressure thereby resulting in a finished image that is partially unclear and not glossy. To solve this problem, as disclosed in Japanese Laid-open Publication No. 62-132680, there has been proposed a method of flattening the surface of a recording paper wherein a heating roller or belt with a flat surface is pushed against the recording paper after printing to subject the recording paper to thermal processing.

However, this conventional flattening process requires that a roller or belt be mounted in addition to a heater on a thermal printer, resulting in a large overall dimension. Further, since the distribution of undulation on the recording paper surface is irregular, sufficient flattening is difficult in a direction perpendicular to the direction of feeding the recording paper, even if the heating roller or belt is pressed in contact with the whole area of the recording paper.

SUMMARY OF THE INVENTION

Therefore, it is a primary object of the present invention to provide a thermal printer which enables flattening of the surface of a recording paper using simple equipment.

It is another object of the present invention to provide a thermal printer capable of performing a flattening process both in the direction of feeding a recording paper and in the direction perpendicular to the feeding direction.

It is a further object of the present invention to provide a thermal printing method capable of performing a flattening process during a character transfer process period using black dye, without the necessity of particular additional equipment or processes.

The foregoing and other objects and advantages of this invention are achieved by the inventive thermal printer wherein a flattening element array is mounted on one side of a recording element array. Immediately after printing with the recording element array, the flattening element array is heated to a temperature lower than the dye transfer temperature to heat and press the surface of a recording paper and thereby flatten undulation of the recording paper surface caused by heat and pressure of the recording element array.

To print a composite image of picture and characters, an ink film having black ink sections is used. In general, there are fewer hard copies requiring character prints, and the character record area occupied within a recording paper is very small. According to the thermal printing method of this invention, the transfer process period is used to transfer black dye in a black section, and the recording element array is used for the flattening process. It is preferable to make the black dye transfer temperature higher than those of other dyes in order to give great heat to a recording paper and perform a sufficient flattening process.

BRIEF DESCRIPTION OF THE DRAWINGS

The objects and advantages of the present invention will become apparent from the following detailed description when read with reference to the accompanying drawings, wherein.

DETAILED DESCRIPTION OF THE PREFERRED EMBODIMENTS

Figure 1:
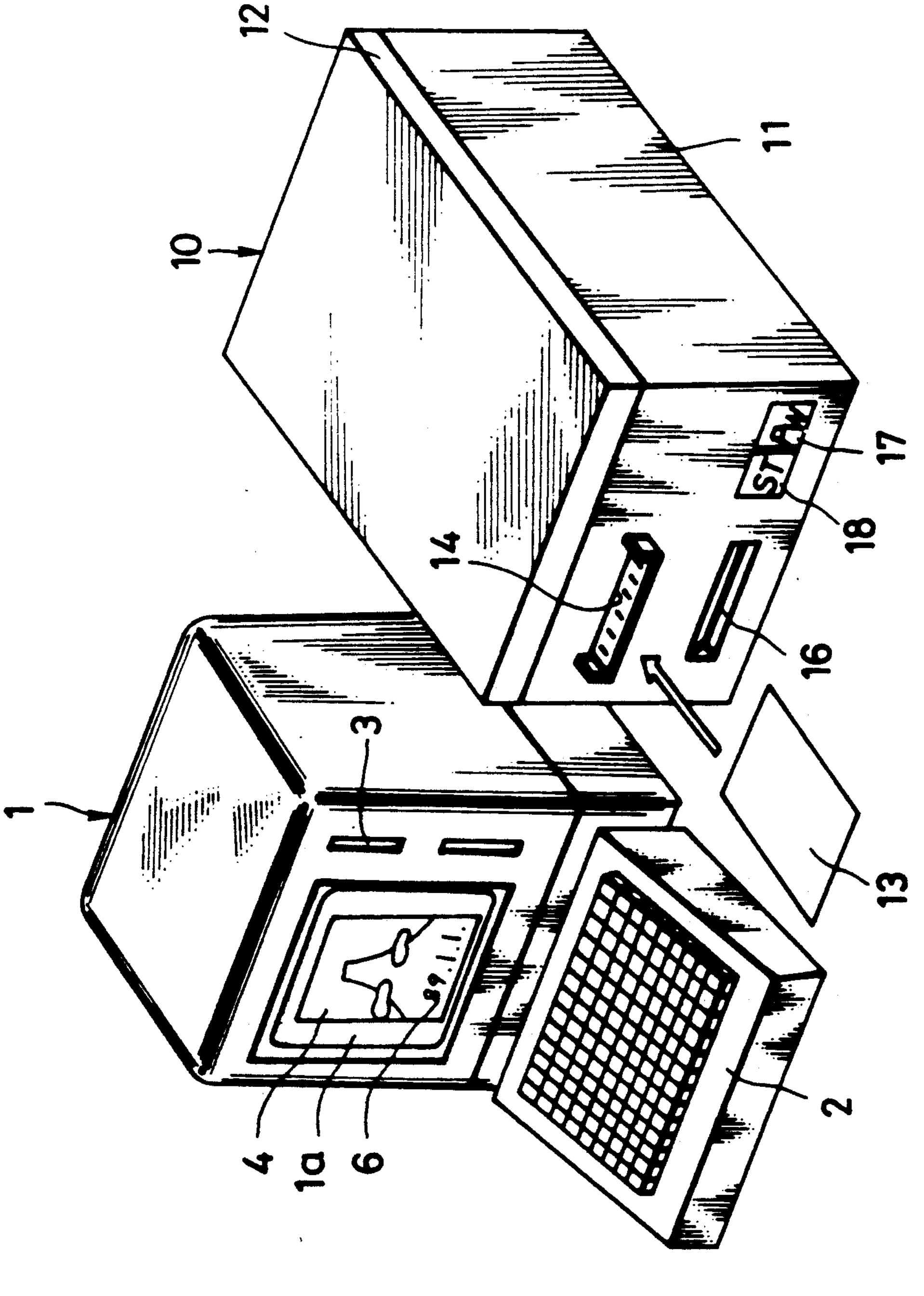
FIG. 1 is a perspective view showing a thermal printer system according to an embodiment of this invention.

Referring to FIG. 1 showing a thermal printer system of this invention, a thermal printer 10 for making a hard copy is connected to a CRT monitor 1. In making a hard copy, a magnetic floppy disc (not shown) is set in a diskette unit 3 as is well known. Image data stored in the floppy disc is read by the diskette unit 3 to display an image 4 on a display screen 1*a*. After confirming this image 4, a keyboard 2 is operated to enter a print instruction so that the image data is sent to a thermal printer 10. This thermal printer 10 provides a printed image of the image 4 displayed on the CRT monitor 1 onto a recording paper 13 through thermal transfer.

It is possible to operate the keyboard 2 and enter desired characters such as year, month and day "89.1.1." which are superposed upon the image 4. After confirming this composite image, a print instruction is entered as described previously to print the synthesized image on the recording paper 13.

The thermal printer 10 is constructed of a casing 11, with a printer mechanism included therein, and a top cover 12 for covering the casing 11. By opening this top cover 12, an ink film 31 (shown in FIG. 2) can be replaced with a new one. An inlet 14 through which a recording paper 13 is inserted, and an outlet 16 from which the recording paper 13 is ejected are formed in the front side of the casing 11. A power switch 17 and a start switch 18 are provided in the lower portion of the front side of the casing 11.

Figure 2:
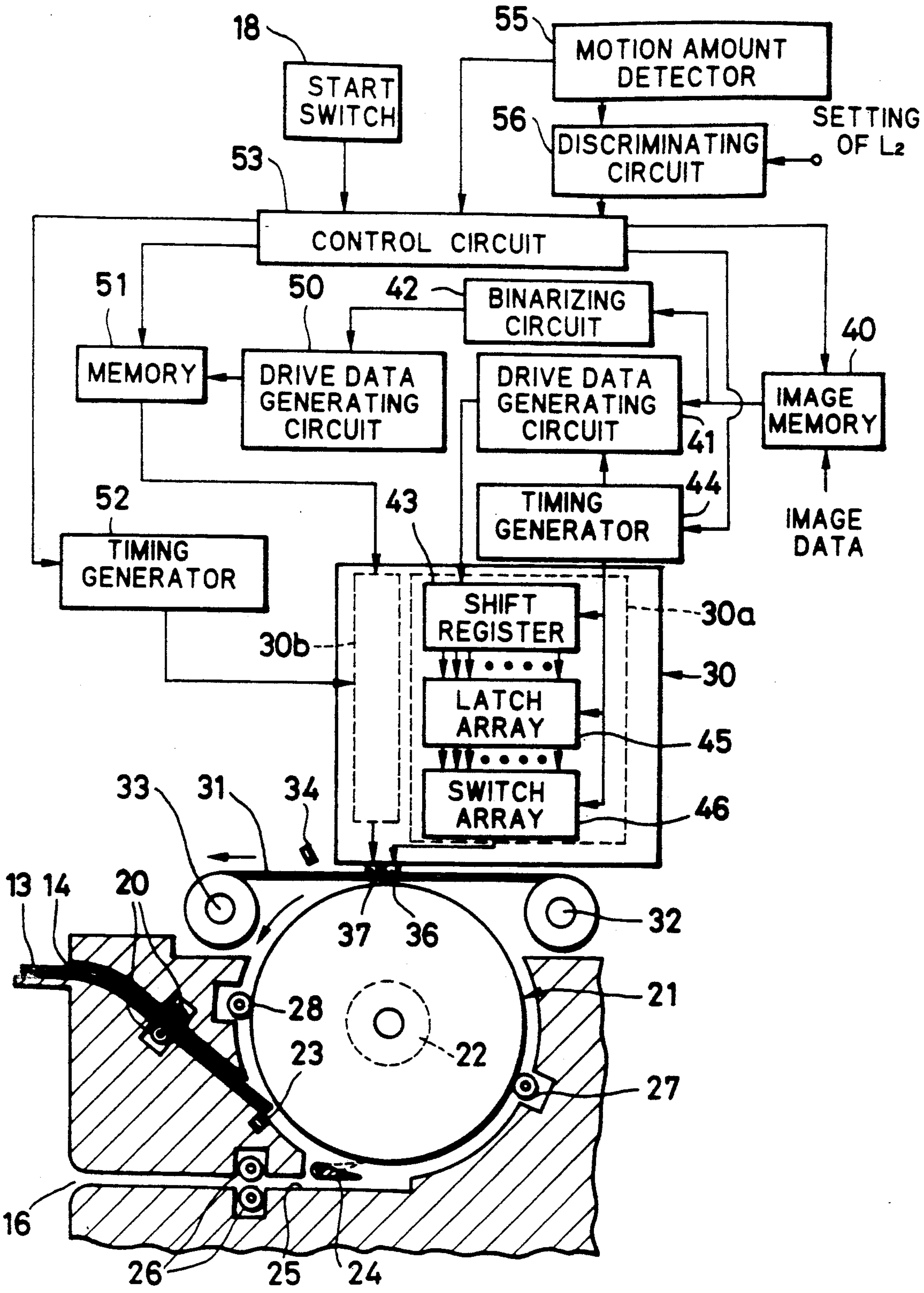
FIG. 2 is a schematic diagram showing the structure of the thermal printer shown in FIG. 1.

Referring to FIG. 2 showing the structure of the thermal printer 10, the recording paper 13 inserted into the inlet 14 is nipped with a pair of feed rollers 20, and is fed toward a platen 21 which is provided with a known chucking mechanism (not shown). When a leading edge of the recording paper 13 is detected with an edge sensor 23, the chucking mechanism is actuated to chuck the leading edge of the recording paper 13. The platen 21 is coupled to a pulse motor 22 which rotates the platen in the counterclockwise direction after the leading edge of the recording sheet 13 has been chucked. During one rotation of the platen 21, an image of a single color is printed. Accordingly, as a color image is printed with yellow (Y), magenta (M) and cyan (C) colors, the platen 21 is rotated three times.

When the recording paper 13 is ejected, the platen 21 rotates clockwise and an ejection sector 24 moves to the position indicated by a broken line, so that the trailing edge of the recording paper 13 is guided by the ejection sector 24 into an ejection path 25. A pair of rollers 27 disposed at the ejection path 25 nip the recording paper 13 and feed it to the outlet 16. When the trailing edge of the recording paper 13 is nipped with the feed rollers 26, the chucking mechanism is released from its chucking operation. Pressure rollers 27 and 28 put the recording paper 13 in tight contact with the outer peripheral surface of the platen 21.

Figure 3:
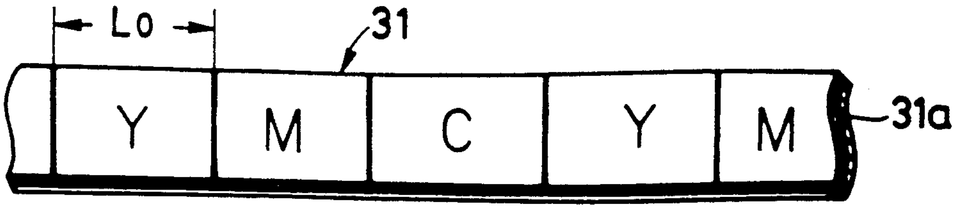
FIG. 3 is a perspective view of an ink film.

An ink film 31, the back surface of which is heated with a thermal head 30, is disposed at the print stage and is extended between a supply reel 32 and a take-up reel 33. As shown in FIG. 3, the ink film 31 has a thin plastic film 31*a*, on one side of which yellow (Y), magenta (M), and cyan (C) sections, each having a width of $L_0$, are formed sequentially. Since the ink film 31 moves in tight contact with the recording paper 13, the size of each color section is made slightly larger than that of the recording paper 31. The color of a color section is detected with a color sensor 34 mounted near the thermal head 30, so that an image of detected color is recorded one line after another with the thermal head 30. Immediately thereafter, a flattening process is carried out one line at a time.

Each ink section is formed by coating on the film 31*a* an ink liquid made of sublimation type dye, binder, and solvent. The sublimation type dye is activated by heat and is transferred to and fixed at an image receiving layer 13*a* (see FIG. 7A) of the recording paper 13. The density of the transferred ink dot changes with an applied heat quantity so that a gradation representation is possible by controlling the power application time to the thermal head.

Figure 5:
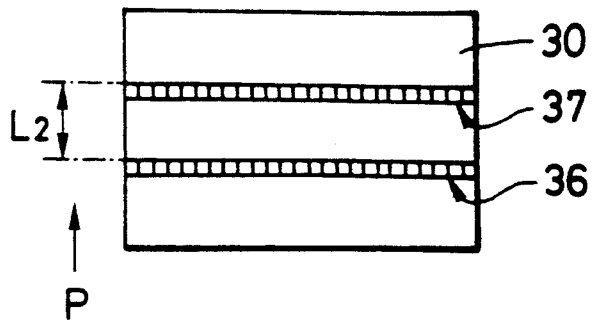
FIG. 5 illustrates the positional relationship between a recording element array and a flattening element array.

A recording element array 36 and flattening element array 37 are mounted respectively under the thermal head 30 in the direction perpendicular to the feeding direction of the recording paper 13, the arrays being separated by a distance $L_2$, as shown in FIG. 5. The recording element array 36 and flattening element array 37 each have the same number of elements which are disposed at the same pitch in the direction perpendicular to the feeding direction (indicated by an arrow P) of the recording paper 13, respective corresponding elements of the arrays 36 and 37 being held at the same position in the width direction of the recording paper 13. The distance $L_2$ is sufficiently small relative to the radius of the platen 21 that both the recording element array 36 and flattening element array 37 contact respective points substantially perpendicular to the outer peripheral surface of the platen 21.

In this embodiment, one line is composed of 512 pixels (dots), and an image of a single color is composed of 480 lines. With the three color frame sequential printing, a half tone color is represented by a subtractive mixture having three color lines superposed. An additive mixture having three color lines slightly shifted, or an intermediate mixture having three color lines partially superposed also may be used. In the meantime, it takes one minute to one and a half minutes to print a color image on a postcard (87×138 mm).

Both the recording element array 36 and flattening element array 37 are constructed primarily of a resistance element array for converting electric energy into heat energy. Each element (resistance element) of the recording element array 36 is supplied with a current $I_0$ for a time corresponding to the density of image data. Thus, each recording element receives by a current pulse having a width corresponding to image data. For example, by changing the pulse width at 64 steps, the density of 64 steps per color can be recorded.

After recording one line, the platen 21 is rotated by one step in the counterclockwise direction, and at the same time the take-up reel 33 is rotated by a predetermined amount to move both the recording sheet 13 and ink film 31, to enable recording of the next line dots. The recording element array 36 may be grouped into a plurality of sections to drive them dynamically.

The image data stored in an image memory 40 are read one line after another, and are sent to a drive data generating circuit 41 and a binarizing circuit 42. The drive data generating circuit 41 converts the image data of each pixel into 64 bits of drive data. For example, image data having a density level of "0" and converted into the drive data having sixty four 0s (low levels) which turn off the recording element. Image data having a density level of "30" is converted into drive data having thirty 1s (high levels) for turning on recording element, and thirty-four 0s. The drive data for respective pixels are converted into 64 groups of serial drive data by reading the digital signals of the same digit bits sequentially in pixel order, so that the 64 groups of serial data are sent to a drive unit 30*a* one after another.

As disclosed, for example, in U.S. Pat. No. 4,710,783, the drive unit 30*a* is constructed of a shift register 43, latch array 45 and switch array 46. This shift register 43 converts the serial drive data into parallel drive data in synchronism with clock signals from a pulse generator or timing generator 44. The parallel drive data is latched at the latch array 45 in synchronism with timing pulses from the timing generator 44. After latching the first bits and upon application of an enable signal from the timing generator 44 to the switch array 46, the switch to which drive data of "1" is applied turns on to power the recording element connected in series with the switch. On the other hand, the switch to which drive data of "0" is applied does not power its recording element. Accordingly, the recording element is powered for the time duration corresponding to the number of bits "1", thus controlling the power application time at 64 steps. After recording one line of dots each having 64 bits of data, the enable signal is stopped.

The recording element may be powered until the contents of a corresponding counter in a subtraction counter array for presetting the image data reaches zero while performing a subtraction operation during one line of printing in response to clock pulses of a constant period. Alternatively, the power application time for the recording element array 36 may be made constant by changing the current value in accordance with the image data. It is preferable to provide a line buffer memory for storing one line of image data between the image memory 40 and drive data generating circuit 41.

Figure 4:
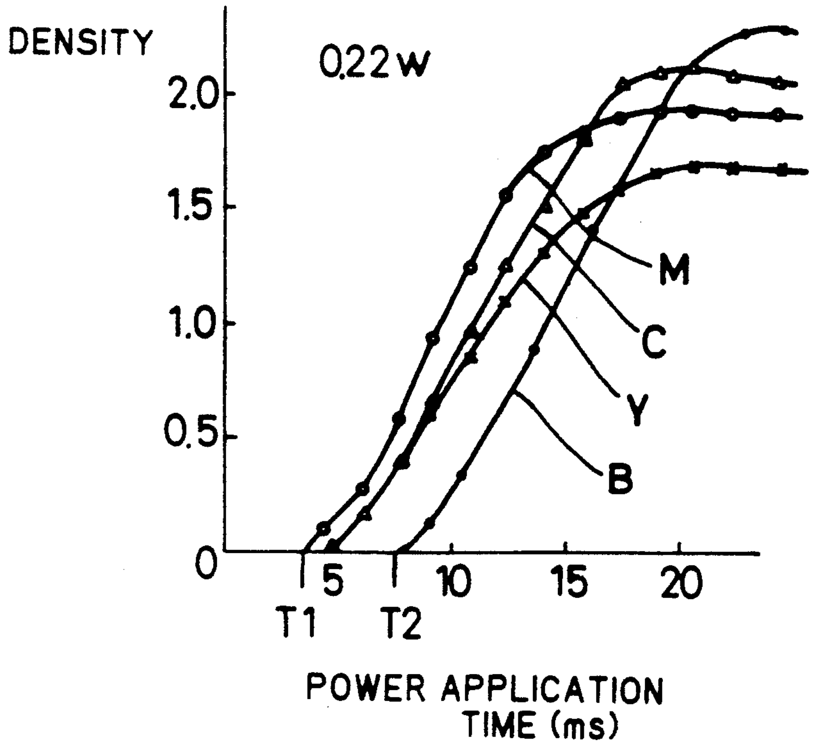
FIG. 4 is a graph showing an example of dye transfer characteristics.

The binarizing circuit 42 converts the image data having a density equal to or lower than a predetermined value into a binary value "1", and the image data in excess of the predetermined value into a binary value "0". The binary data is sent to a drive data generating circuit 50. The drive data generating circuit 50 converts the binary data "1" into 64 bits of drive data. This drive data has a predetermined number of 1s so as to make the power application time $T_1$ as shown in FIG. 4. This limited power application time prevents a thermal transfer during the flattening process for the recording paper 13 by the flattening element array 37.

For the binary data "0", the drive data are converted into sixty-four consecutive 0s. The drive data are read divisionally as 64 groups of serial drive data, and are stored temporarily in a memory 51. During the flattening process, the serial drive data are read from the memory 51 and are sent to another drive unit **30*b*. This drive unit 30*b*, which has the same structure as the drive unit 30*a* for the printing operation, is controlled in part by a timing generator 52**.

A motion amount detector 55 counts the number of drive pulses supplied to the pulse motor 22 and measures the motion amount of the recording paper 13. Each time the motion amount detector 55 detects a one line motion of the recording paper 13, a control circuit 53 causes the recording element array 36 to start printing one line of dots. As shown in FIG. 5, since the recording element array 36 is disposed a distance $L_2$ from the flattening element array 37, a discriminating circuit 56 is provided for detecting a motion of the recording paper 13 by the distance $L_2$. In response to the signal outputted from the discriminating circuit 56, the memory 51 starts to be read, and the flattening element array 37 is driven in a manner similar to the recording element array 36. It is important to note that the recording element array 36 is driven for a power application time which is longer than $T_1$ and is set at a value corresponding to the dot intensity so that each recording element is heated to a temperature equal to or higher than the transfer temperature of dye, whereas the power application time of the flattening element array 37 is set to be $T_1$. The time $T_1$ for performing the flattening process is shorter than the transfer time of the dye, but is long enough for the flattening process.

Next, the operation of the above embodiment will be described briefly. First the power switch 17 of the thermal printer 10 is turned on and a recording paper 13 is inserted into the inlet 14. Thereafter, the start switch 18 is turned on. The leading edge of the recording paper 13 is nipped with the feed rollers 20 and is fed toward the platen 21. The sensor 23 detects the leading edge of the recording paper 13, and outputs a detection signal which activates the chucking mechanism so that the recording sheet 13 is chucked at the outer peripheral surface of the platen 21. Immediately thereafter, the platen 21 starts rotating in the counterclockwise direction. As the platen 21 rotates, the recording paper 13 is fed while being wound in tight contact with the outer peripheral surface of the platen 21 by the action of the pressure roller 27. At the same time, the take-up reel 33 rotates until the color sensor 34 detects the first color section, e.g., yellow section Y.

The control circuit 53 checks the motion amount of the recording paper 13 detected by the motion amount detector 55 and causes to start thermal transfer of a yellow image when the leading edge of the recording paper 13 reaches the recording element array 36. During the thermal transfer of an yellow image, the yellow image data are read from the image memory 40 one line after another, and are sent to the drive data generating circuit 41 and binarizing circuit 42. The drive data generating circuit 41 converts the image data of one line pixels into drive data of respective pixels each having 64 bits, and outputs one line drive data a total of 64 times.

During a first data transfer, the first bits of drive data for respective pixels are read sequentially in pixel order and are transformed into serial drive data which are transferred to the shift register 43. The drive data, inputted one bit after another, are shifted in synchronism with clock pulses from the timing generator 44, and are converted into parallel drive data corresponding in bit number to that of an element of the recording element array 36. These parallel drive data are latched at the latch array 45 in synchronism with clock pulses form the timing generator 44.

Upon an enable signal from the timing generator 44, the switch to which drive data "1" is applied is turned on to power the recording element (resistance element) connected in series with the switch. Next, the second bits of the drive data for respective pixels are read to drive the recording elements. In this case, the recording element to which the second bit of "1" is applied stays turned on, whereas the recording element to which the second bit of "0" is applied is turned off.

After 64 bits of drive data have been supplied to the switch array 46, the enable signal turns off and the one line printing operation is terminated. A recording element therefore is supplied with a current pulse of value $I_0$ for the time proportional to the number of "1" bits within the drive data of 64 bits. After printing one line of a yellow image the platen 21 is moved by one step by the pulse motor 22, and the ink film 31 is wound up by one step. In the similar manner as above, the second and following lines of the yellow image are sequentially printed on the recording paper 13.

Figure 6A:
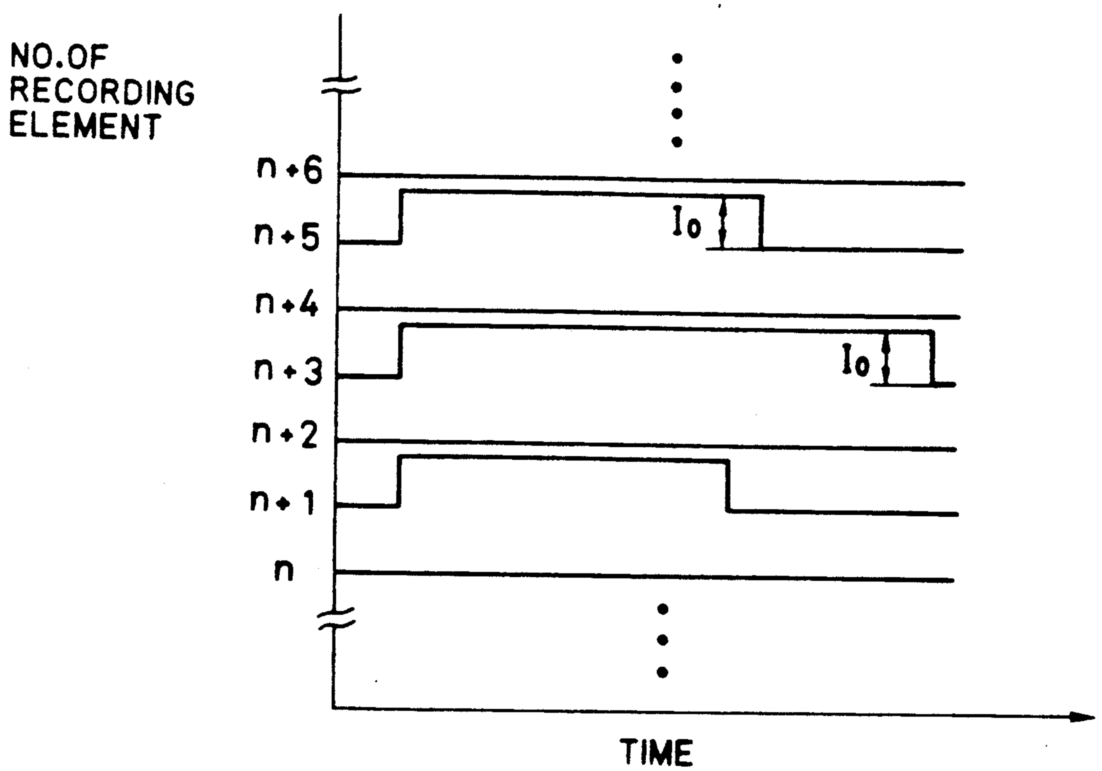
FIG. 6A shows waveforms of current pulses supplied to the recording element array.
Figure 7A:
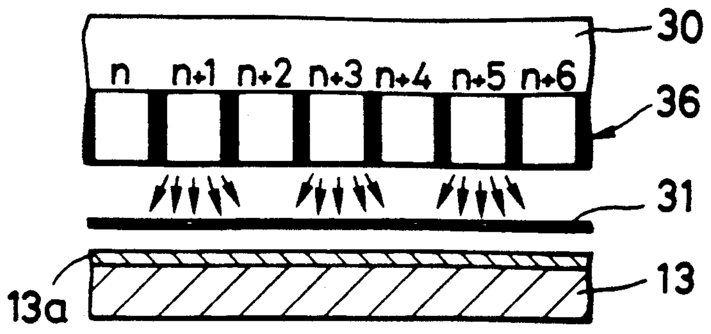
FIGS. 7A to 7D illustrate the printing and flattening processes.
Figure 7B:
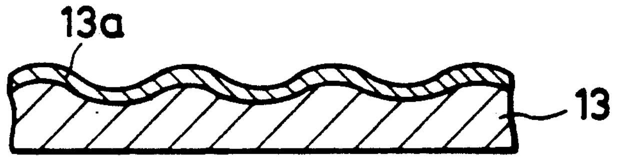

As the current pulses as shown in FIG. 6A are applied to the (n+1)-th, (n+3)-th, and (n+5)-th recording elements, the recording elements generate heat as shown in FIG. 7A. These recording elements therefore heat and press the back surface of the ink film 31 in tight contact with the recording paper 13, so that yellow dye in the ink film 31 is transferred to the image receiving layer 13a of the recording paper 13. During dye transfer, the heated portion is depressed so that the surface of the recording paper 13 has minute undulations, as shown in FIG. 7B.

In the meantime, the binarizing circuit 42 converts the image data having a density in excess of a reference value into a binary value of "0", and the image data having a density equal to or smaller than the reference value into a binary value of "1", the binary data being sent to the drive data generating circuit 50. The drive data generating circuit 50 converts the binary data into two types of drive data which are stored in the memory 51. While the recording paper 13 is fed intermittently and the yellow dye is transferred one after another, the first line will reach the position of the flattening element array 37. This is detected with the motion amount detector 55 and discriminating circuit 56. Then, the control circuit 53 causes the one line of drive data to be read from the memory a total of 64 times and supplied to the drive unit 30b. The drive unit 30b turns on the flattening element upon reception of a digital signal "1" and maintains its on-state until N pulses have been supplied from the pulse generating circuit 52. Accordingly, the flattening element turned on is supplied with a current $I_0$ for the time $T_1$, and is heated correspondingly. The temperature of the flattening element is maintained lower than the dye sublimation point so that dye will not be transferred to the recording paper 13.

Figure 6B:
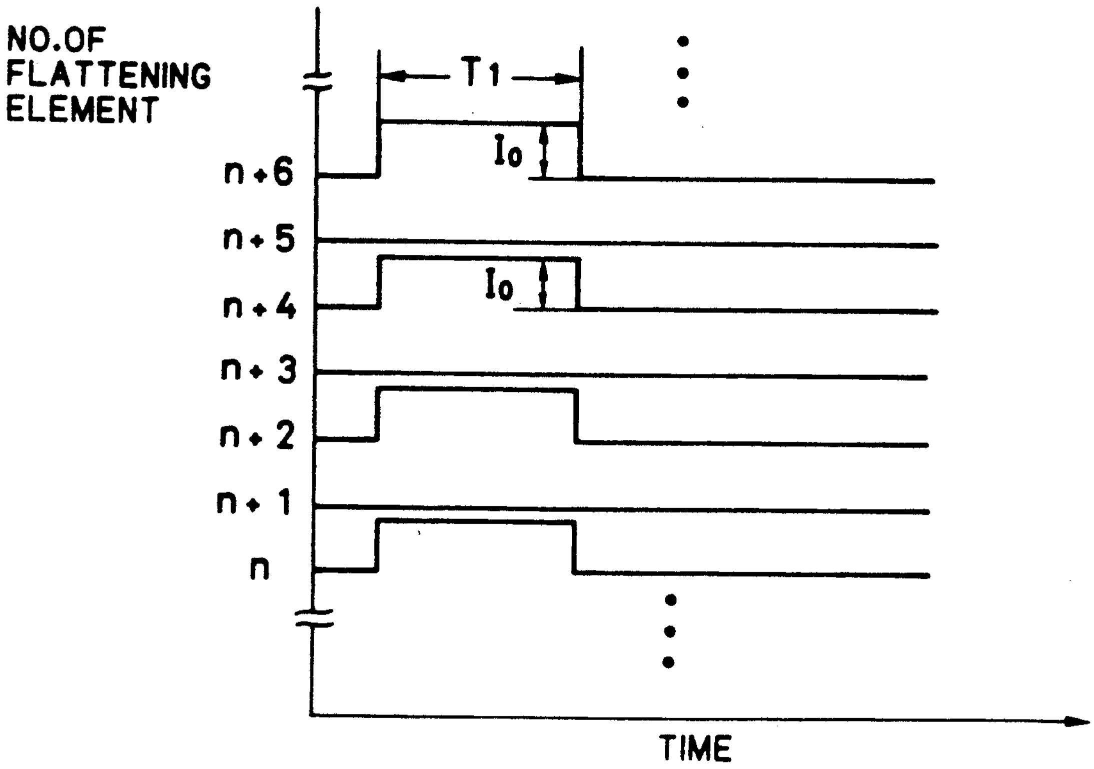
FIG. 6B shows waveforms of current pulses applied to the flattening element array.
Figure 7C:
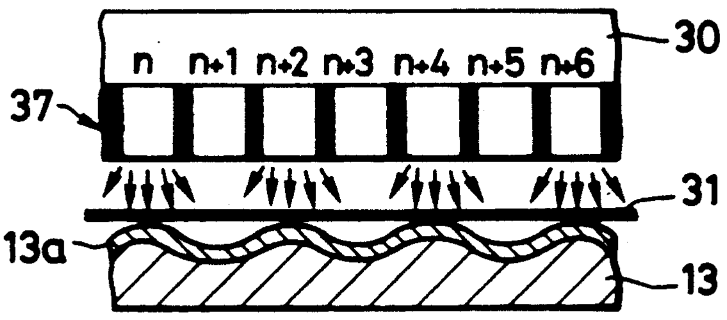
Figure 7D:
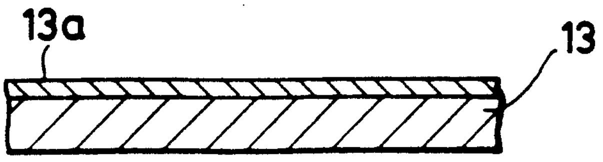

As shown in FIG. 6B, as the current pulses are applied to the n-th, (n+2)-th and (n+4)-th flattening elements, they generate heat as shown in FIG. 7C. Since the portion at which the pixel has not been printed is heated, the overall surface of the recording paper 13 is made flat and becomes glossy, as shown in FIG. 7D.

The current application time (pulse width) to the flattening element may be made variable. For example, the current application time to the (n+2)-th flattening element may be made the same as that to the (n+1)-th recording element. In this case, in order to prohibit image printing during the flattening process, the current value for the flattening element array is required to be smaller than the current $I_0$ supplied to the recording element array 27. In order to change the power application time, an inverter is provided which inverts the drive data from the drive data generating current 41. The inverted drive data is written in the memory 51. In this manner, it is possible to provide a flattening process which is suitable for a particular degree of undulation during the printing operation.

After completion of the thermal printing and flattening process for the yellow image, the platen 21 rotates rapidly in the counterclockwise direction so that the ink film 31 is wound about the take-up reel 33, and the leading edge of the second color magenta section M is fed to the position where the color sensor 34 detects the edge. The printing operation for the magenta image is carried out in a manner similar to that for the yellow image, and in parallel with this operation, the flattening process also is carried out. Lastly, the thermal printing and flattening process for the cyan image are carried out so that a color image can be printed on the recording paper 13 by means of three color frame sequential thermal printing.

After completion of the printing of a color image, the eject sector 24 is moved to the position indicated by a broken line and the platen 21 is rotated in the clockwise direction. The trailing edge of the recording paper 13 is guided by the eject sector 24 into the eject path 25. Since the chucking is released at this time, the recording paper 13 is guided by the eject sector 24 into the eject path 25. Since the chucking is released at this time, the recording paper 13 is nipped with the feed rollers 27 and ejected out from the outlet 16.

Figure 8:
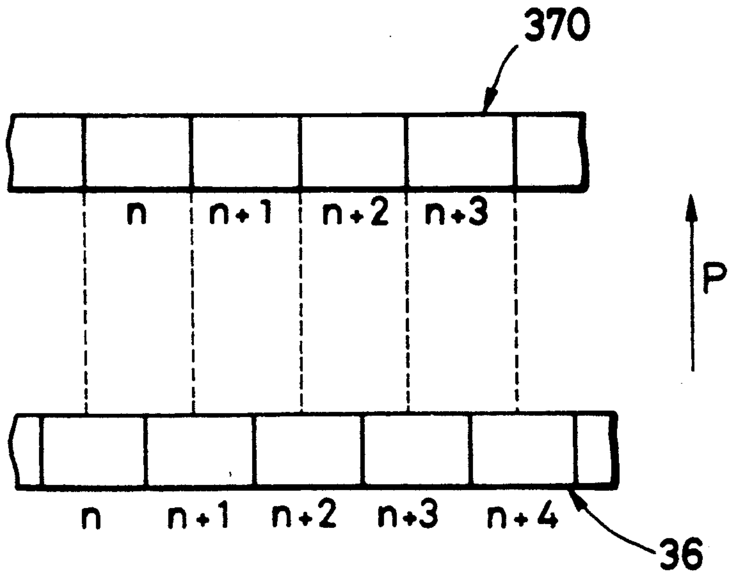
FIG. 8 illustrates the positional relationship between a recording element array and a flattening element array according to another embodiment of the invention.

FIG. 8 shows another structure of the flattening element array. In this embodiment, the flattening element array 370 is displaced by half the length of the flattening element in a direction perpendicular to the direction P of feeding of the recording paper 13. With this structure, each flattening element is positioned at the line extending from the border between two adjacent recording elements of the recording element array 27. Therefore, it is possible to heat all of the flattening elements to the same temperature without referring to the image data.

Figure 9:
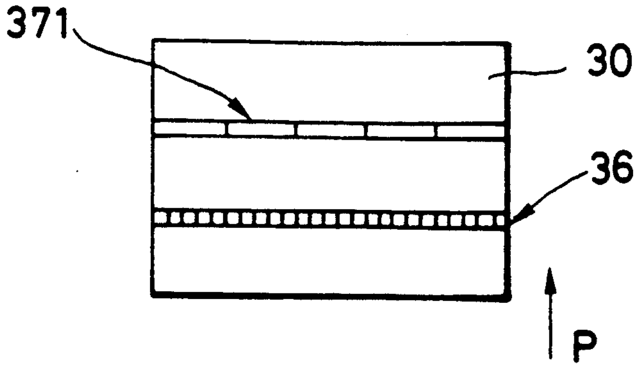
FIG. 9 is similar to FIG. 5 and shows an embodiment which uses a flattening element array the elements of which are made longer.
Figure 10:
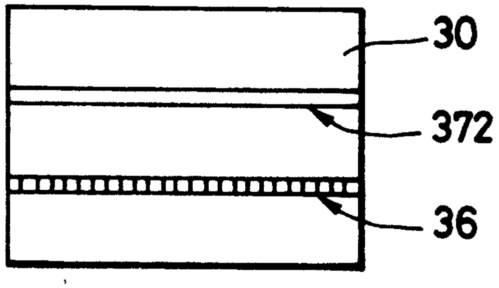
FIG. 10 is similar to FIG. 5 and shows an embodiment which uses a flattening element array having only one elongated flattening element.

Each flattening element of a flattening element array 371 shown in FIG. 9 is five times as long as each recording element. In an embodiment shown in FIG. 10, a single elongated flattening element 372 is used. In these embodiments, the flattening elements are heated to the same temperature irrespective of the printing condition of an image.

Figure 11:
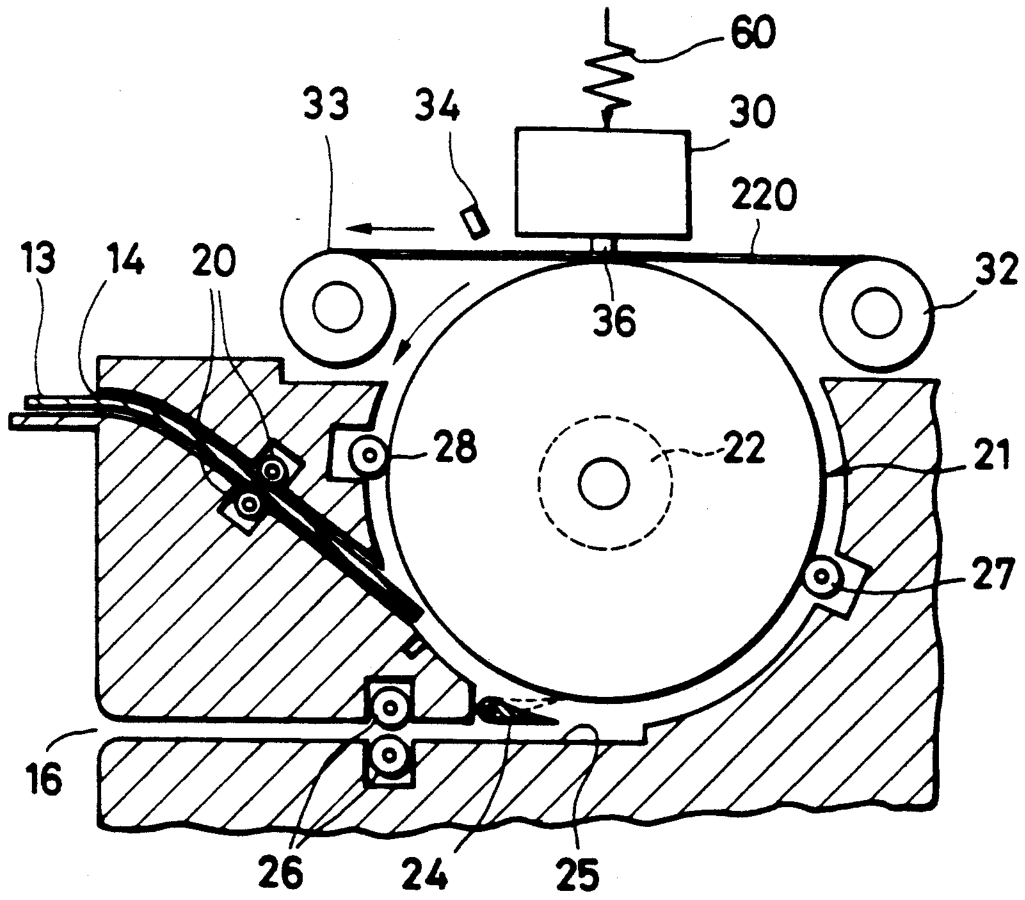
FIG. 11 is a schematic diagram of a thermal printer for performing the method of this invention which carries out the flattening process by using the character print process period.
Figure 12:
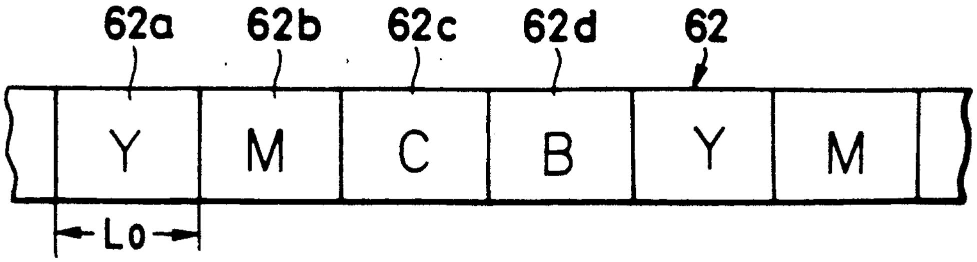
FIG. 12 illustrates the ink film shown in FIG. 11.

FIG. 11 shows the main part of another embodiment wherein a flattening process is carried out by using the recording element array. Similar elements to those shown in FIG. 2 are represented by identical reference numerals. A thermal head 30 has a single recording element array 36 which performs both the thermal printing and flattening process. The recording element array 36 is pressed against an ink film 62 by means of a spring 60. This ink film 62 has a yellow section 62a, a magenta section 62b, a cyan section 62c, and a black section 62d disposed alternately at a pitch of $L_0$ as shown in FIG. 12.

Figure 13:
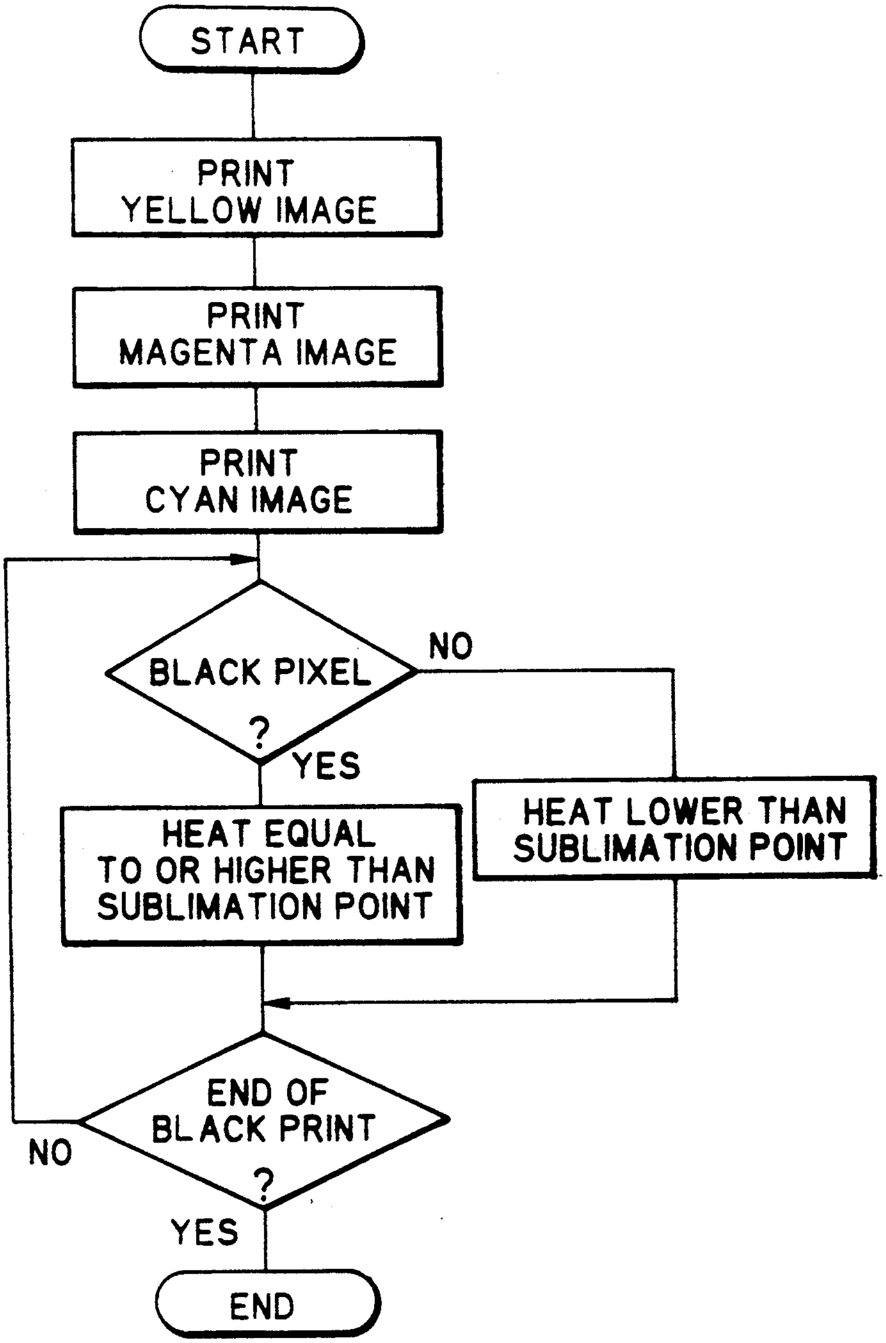
FIG. 13 is a flow chart of the method shown in FIG. 11.

FIG. 13 illustrates the procedure of thermal printing by the thermal printer shown in FIG. 11. As described previously, a yellow image, magenta image, and cyan image are printed sequentially on a recording paper 13 with the color sections 62a to 62c. Characters are printed last by using the black section 62d. However, in this case, most prints have no characters to be printed, or if there are characters to be printed, the area where characters are printed is small. In view of this, the flattening process is carried out during the character printing period using the black section. During this flattening process, a current pulse having a large width is supplied to the recording element which prints pixels of a character in order to heat the ink film 62 to a temperature higher than the transfer temperature, whereas a current pulse having a small width is supplied to the recording elements which do not print characters in order not to heat the ink film higher than the sublimation temperature. In this manner, there is printed a hard copy having a composite image of picture and characters such as a year, month and day as shown in FIG. 1.

During the above flattening process, it is preferable to provide a relatively large amount of heat energy. For this reason, it is preferable to use black dye having a higher transfer temperature than that of the other dyes as shown in FIG. 4. With this black dye having the characteristic shown in FIG. 4, it is possible to set the power application time at $T_2$ ($T_2 > T_1$).

In the above embodiments, the flattening element array is positioned above the ink film. The flattening element array may be positioned facing the outer peripheral surface of the platen 21 without interposing the ink film therebetween. In this case, the flattening element directly contacts the recording paper, so that the flattening element can be heated higher than the dye transfer temperature.

The invention also is applicable to a thermo-melting type thermal printer which attaches thermo-melted dye on a recording paper.

While the invention has been described in detail with reference to preferred embodiments, various changes within the spirit of the invention will be apparent to those of working skill in this technological field. Thus, the invention is to be considered as limited only by the scope of the appended claims.

What is claimed is:

1. A thermal printer comprising:

printing means having a plurality of recording elements disposed linearly in a direction perpendicular to a direction of feeding a recording paper, said printing means including means for heating said plurality of recording elements, said printing means pressing an ink film in tight contact with said recording paper from a back surface of said ink film when said recording elements are heated, and transferring dye within said ink film onto said recording paper to form a dot at a pixel area of said recording paper, said ink film having at least yellow, magenta, and cyan color sections; and flattening means for flattening said recording paper, including means for heating said flattening means, said flattening means pressing said recording paper after printing, said flattening means being disposed in contact with the back surface of said film perpendicular to said recording paper feeding direction downstream of said printing means in said recording paper feeding direction, said flattening means heating said ink film to a temperature lower than the transfer temperature of said dye and being driven at least during a final dye transfer process from said at least three color sections for each recording of a color image.

2. A thermal printer according to claim 1, wherein said flattening means comprises a single elongated resistor.

3. A thermal printer according to claim 1, wherein said flattening means comprises an array of a plurality of flattening elements disposed linearly.

4. A thermal printer according to claim 3, wherein each of said flattening elements and each of said recording elements is of a same size, and is disposed at same position with respect to a lateral direction of said recording paper.

5. A thermal printer according to claim 4, further including means for supplying a current pulse to said flattening means in accordance with a heated condition of said printing means, so as to heat and press a pixel area of said recording paper where no dot has been printed.

6. A thermal printer according to claim 5, wherein said flattening elements comprises resistance elements.

7. A thermal printer according to claim 1, wherein said flattening means is driven during respective dye transfer processes from said at least three color sections.

8. A thermal printer comprising:

a first resistance element array having a plurality of resistance elements disposed linearly, said first resistance element array being disposed perpendicular to a direction of feeding a recording paper;

means for heating said first resistance array, said first resistance element array heating and pressing an ink film in tight contact with said recording paper from a back surface of said ink film when said resistance elements are heated, and transferring dye within said ink film onto said recording paper to form dots at pixel areas of said recording paper;

a second resistance array having a plurality of resistance elements disposed linearly; and means for heating said second resistance array, said second resistance array flattening the surface of said recording paper by heating and pressing said surface after printing from the back surface of said ink film at a temperature lower than the dye transfer temperature, said second resistance array being disposed perpendicular to said recording paper feeding direction downstream of said first resistance element array, such that upon powering of each of said resistance elements of said second resistance element array, said resistance element heats and presses the surface of said recording paper at boundaries of said pixel areas.

9. A thermal printer according to claim 8, wherein all resistance elements of said second resistance element array are heated at a same time irrespective of printing conditions of said pixel areas.

10. A thermal printing method using an ink film which has three color sections coated with three color dyes followed by a black section coated with black dye, the method including:

heating and pressing a back surface of the ink film by a recording element array having a plurality of recording elements to transfer said dyes onto a recording paper which is fed together with said ink film;

printing a color image on the recording paper with three color dyes through three color frame sequential thermal transfer; and printing characters on the recording paper with black dye, said method further comprising the step of, during a transfer process of said black dye, heating said recording elements facing pixel areas where no character is printed to a temperature lower than a surface temperature of said black dye, and flattening said pixel areas.

11. A thermal printing method according to claim 10, wherein a transfer temperature of said black dye is higher than a transfer temperature of any of said three color dyes.

12. A thermal printing method according to claim 11, wherein said three color dyes are yellow, magenta and cyan dyes.

* * * * *